US010679015B1

(12) United States Patent
Szarvas et al.

(10) Patent No.: US 10,679,015 B1
(45) Date of Patent: Jun. 9, 2020

(54) UTILIZING ARTIFICIAL INTELLIGENCE-BASED MACHINE TRANSLATION TO AUGMENT DOCUMENT SUMMARIZATION

(71) Applicant: Amazon Technologies, Inc., Seattle, WA (US)

(72) Inventors: Gyorgy Istvan Szarvas, Berlin (DE); Gregory Alan Hanneman, Pittsburgh, PA (US); Alon Lavie, Pittsburgh, PA (US)

(73) Assignee: Amazon Technologies, Inc., Seattle, WA (US)

( * ) Notice: Subject to any disclaimer, the term of this patent is extended or adjusted under 35 U.S.C. 154(b) by 1060 days.

(21) Appl. No.: 14/981,536

(22) Filed: Dec. 28, 2015

(51) Int. Cl.
*G06F 40/00* (2020.01)
*G06F 40/58* (2020.01)
*G06N 7/00* (2006.01)
*G06N 20/00* (2019.01)

(52) U.S. Cl.
CPC .............. *G06F 40/58* (2020.01); *G06N 7/00* (2013.01); *G06N 20/00* (2019.01)

(58) Field of Classification Search
CPC .................................................. G06F 17/289
USPC ........................................................ 706/11
See application file for complete search history.

(56) References Cited

U.S. PATENT DOCUMENTS

| 8,359,285 | B1 | 1/2013 | Dicker et al. |
| 8,386,336 | B1 | 2/2013 | Fox et al. |
| 8,438,149 | B1 | 5/2013 | Dicker et al. |
| 8,554,701 | B1 * | 10/2013 | Dillard ................ G06F 17/2785 706/12 |
| 8,700,480 | B1 | 4/2014 | Fox et al. |
| 8,756,050 | B1 * | 6/2014 | Harkness .............. G06F 17/289 704/1 |
| 2006/0020928 | A1 * | 1/2006 | Holloway ............... G06F 9/454 717/136 |
| 2006/0200342 | A1 * | 9/2006 | Corston-Oliver ..... G06F 16/355 704/10 |
| 2009/0210404 | A1 * | 8/2009 | Wilson .................. G06F 16/332 |

(Continued)

OTHER PUBLICATIONS

Denecke, "How to Assess Customer Opinions Beyond Language Barriers?", 2008, IEEE, pp. 430-435. (Year: 2008).*

(Continued)

*Primary Examiner* — Hien D Khuu
(74) *Attorney, Agent, or Firm* — Lee & Hayes, P.C.

(57) ABSTRACT

Technologies are disclosed for utilizing artificial intelligence-based machine translation to augment document summarization. Text can be extracted from a document in a first language. Machine translation can be utilized to translate the text from the first language to a second language. The translated text can be used to identify documents in the second language that include support for the translated text. A user interface can be provided that indicates the number of documents in the second language that provide support for the extracted text. Documents in the first language can also be translated to the second language. Documents that provide support for a text string can be identified in the documents translated to the second language and in other documents in the second language. A user interface can be provided that indicates the number of documents in the first language and the second language that provide support for the text.

20 Claims, 11 Drawing Sheets

(56) References Cited

U.S. PATENT DOCUMENTS

2017/0140563 A1* 5/2017 No ................. G06F 3/0482
2018/0089169 A1* 3/2018 Yamauchi ........... G06F 17/2264

OTHER PUBLICATIONS

Zhou et al., "Cross-Language Opinion Target Extraction in Review Texts", 2012, IEEE, pp. 1200-1205. (Year: 2012).*

* cited by examiner

UTILIZING ARTIFICIAL INTELLIGENCE-BASED MACHINE TRANSLATION TO AUGMENT DOCUMENT SUMMARIZATION

BACKGROUND

It can be desirable in certain scenarios to identify a large number of documents that include textual support for a particular statement. In many cases, however, a sufficiently large corpus of documents does not exist from which to identify a desired number of documents that include textual support for the statement.

The disclosure made herein is presented with respect to these and other considerations.

DETAILED DESCRIPTION

Figure 1A:
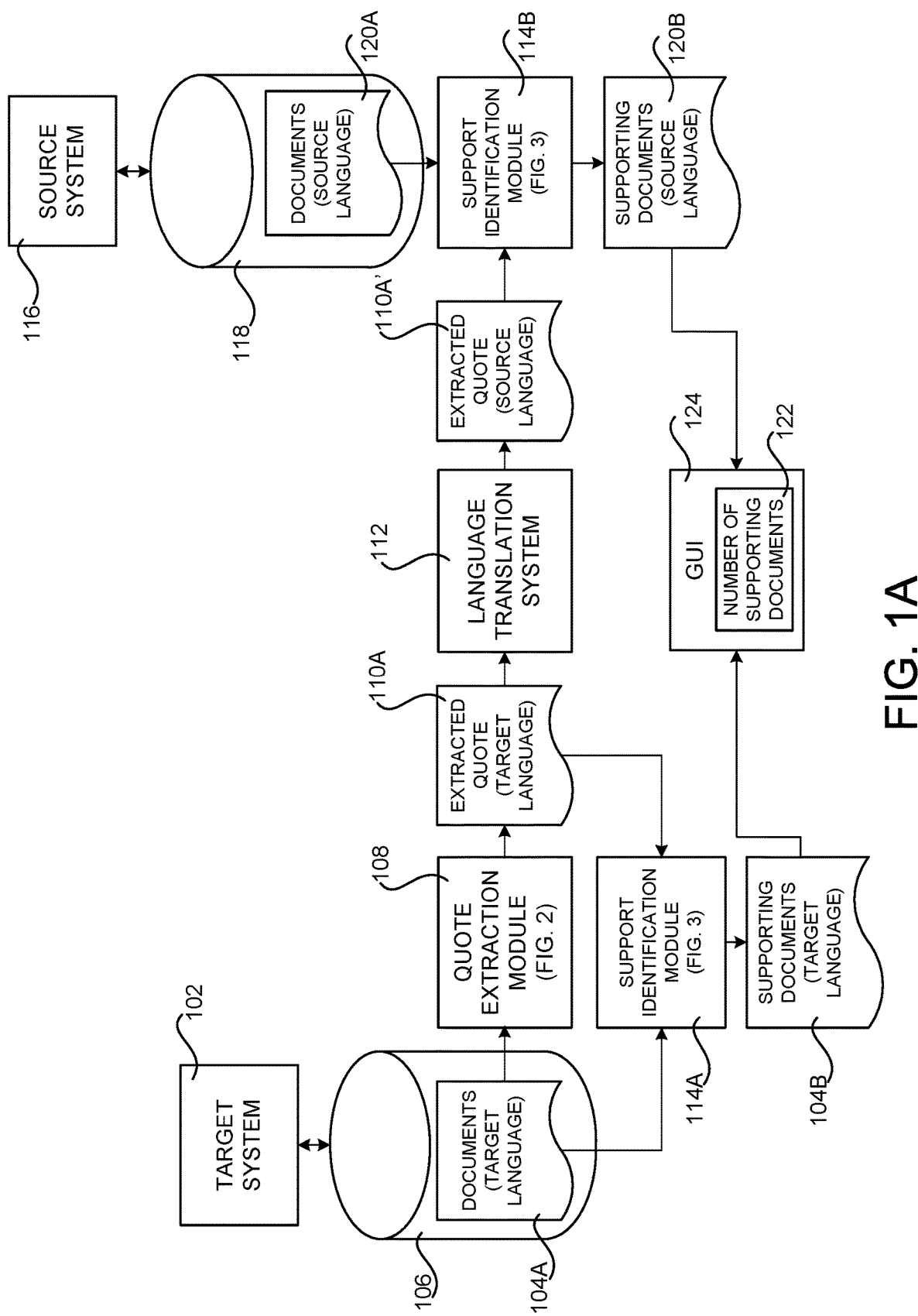
FIGS. 1A-1D are system architecture diagrams showing aspects of the configuration and operation of several mechanisms disclosed herein for utilizing machine translation to augment document summarization.

The following detailed description is directed to technologies for utilizing artificial intelligence-based machine translation to augment document summarization. Utilizing an implementation of the technologies described herein, a representative quote can be extracted from a document expressed using a first human-readable language and machine translated to a second human-readable language. The machine-translated quote can then be utilized to identify one or more documents in the second human-readable language that provide support for the quote. In this way, a larger corpus of documents can be made available from which to identify documents that include textual support for the extracted quote. The technologies disclosed herein can also provide additional technical benefits other than those described specifically herein.

In order to enable the functionality disclosed briefly above, a source system can be provided that is configured to maintain documents that are expressed in a source human-readable language (the "source language"). For example, and without limitation, the source system can be a merchant system that provides functionality for allowing customers to browse and purchase physical or digital items. In this example, the documents maintained by the source system can be item reviews expressed using the English language.

A target system can also be provided that is configured to maintain documents in a target human-readable language (the "target language"). The target system can also, for example, be a merchant system that also provides functionality for allowing customers to browse and purchase physical or digital items. The target language utilized by the target system is, however, a different human-readable language than the source language utilized by the source system. In the example where the source documents are expressed in English, the documents maintained by the target system can be item reviews expressed using a language other than English, such as German or French. In this example, there may be many more item reviews expressed using the English language than in the non-English language.

The target system can also be configured to execute a quote extraction module. The quote extraction module utilized by the target system is an executable software component that provides functionality for extracting representative quotes from the documents in the target language. The target system can also be configured to execute a support identification module. The support identification module utilized by the target system is an executable software component configured to identify documents in the target language that provide textual support for a given quote. The source system can also be configured to execute a quote extraction module and a support identification module for extracting representative quotes from the documents in the source language and for identifying documents in the source language that provide textual support for an extracted quote, respectively. Details regarding the quote extraction module are provided below with regard to FIG. 2. Details regarding the operation of the support identification module are provided below with regard to FIG. 3.

In one configuration, documents in the source language can be utilized to provide support for a quote extracted from a document in the target language. In particular, the quote extraction module can be executed by the target system to extract a representative quote from a document in the target language. The extracted quote can then be translated to the source language. For example, a statistical machine translation system can be utilized to translate the extracted quote in the target language to the source language.

Once the quote has been translated to the source language, the source system may execute the support identification module in order to identify the documents in the source language that include support for the quote. The number of documents in the source language that provide support for the quote can then be identified. A graphical user interface ("GUI") or other type of user interface can then be provided that identifies the number of documents in the source language that provide support for the quote. In the example where the source documents are item reviews expressed using the English language, a GUI or other type of user interface might be presented that includes the extracted quote and further states "X other reviews in English say the same thing", where X is the number of item reviews in the source language that provide support for the quote. The target system can also utilize the support identification module to determine the number of documents in the target language that provide support for the quote. In this example, a GUI can be provided that includes the extracted quote and further states "Y other reviews in German and X other reviews in English say the same thing", where Y is the number of item reviews in the target language (i.e. German) that provide support for the quote and X is the number of item reviews in the source language (i.e. English) that provide support for the quote. Additional details regarding this configuration are provided below with regard to FIG. 1A.

In another configuration, the source system can execute a quote extraction module to extract representative quotes from documents in the source language. The extracted quotes can then be provided to a language translation system, such as a statistical machine translation system, for translation into the target language. The target system can also execute a quote extraction module in order to extract a quote from one of the target documents in the target language. The target system can also execute a support identification module to identify documents in the target language or quotes translated to the target language by the language translation system that support the quote extracted from the document in the target language. A GUI can then be provided that identifies the number of documents in the target language and the source language that provide support for the quote extracted from the document in the target language. Additional details regarding this configuration are provided below with regard to FIG. 1B.

In another configuration, the documents in the target language are machine translated to the source language. A representative quote can be extracted from one of the documents that has been translated to the source language. The source system can then execute the support identification module in order to identify documents that contain support for the extracted quote among the documents translated to the source language and other documents in the source language. Alternately, a representative quote can be extracted from a document in the target language. The extracted quote can then be machine translated to the source language. The source system can then execute the support identification module in order to identify documents that contain support for the extracted quote among the documents translated to the source language and other documents in the source language. A GUI can also be provided indicating the number of documents in the source and target languages that provide support for the quote. Additional details regarding this configuration are provided below with regard to FIG. 1C.

In another configuration, the documents in the source language are machine translated to the target language. A representative quote is extracted from a document in the target language. The target system executes a support identification module in order to identify documents that provide support for the extracted quote among the documents translated to the target language from the source language and other documents in the target language. A GUI can also be provided indicating the number of documents in the source and target languages that provide support for the quote. Additional details regarding this configuration are provided below with regard to FIG. 1D.

In yet another configuration, two or more of the mechanisms described briefly above for identifying documents that provide support for a quote can be performed. The output of the various mechanisms can then be utilized together to improve the reliability of the output. Additional details regarding this aspect of technologies disclosed herein will be provided below with regard to FIG. 4.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIGS. 1A-1D are system architecture diagrams showing aspects of the configuration and operation of several mechanisms disclosed herein for utilizing machine translation to augment document summarization. Referring now to FIG. 1A, aspects of the configuration and operation of one such mechanism will be described. In particular, in order to enable the functionality discussed herein a source system 116 is provided in one configuration that maintains documents 120A that are expressed in a human-readable language (which might be referred to herein as the "source language") in an appropriate data store 118. For example, and without limitation, the source system 116 can be a merchant system that provides functionality for allowing customers to browse and purchase physical or digital items. In this example, the documents 120A maintained by the source system are customer-supplied item reviews associated with items available from the merchant system that have been expressed using the English language, for instance.

A target system 102 is also provided in one configuration that maintains an appropriate data store 106 storing documents 104A that have been expressed in another human-readable language (which might be referred to herein as the "target language"). The target system 102 can also, for example, be a merchant system that also provides functionality for allowing customers to browse and purchase physical or digital items. The target language utilized by the target system 102 is, however, a different human-readable language than the source language utilized by the source system 116. Consequently, in the example where the source documents 120A are expressed in English, the documents 104A maintained by the target system 102 can be item reviews associated with items available from a merchant system that have been expressed using a language other than English, such as German or French. In this example, there may be many more item reviews (i.e. documents 120A) for an item that have been expressed using the English language than there are item reviews (i.e. documents 104A) for the same item that have been expressed in the non-English language. Additional details regarding an illustrative merchant system that can be utilized to provide the functionality disclosed herein in one configuration are provided below following the discussion of FIG. 4.

The target system 102 can also be configured to execute a quote extraction module 108 in one particular configuration. The quote extraction module 108 utilized by the target system 102 is an executable software component that provides functionality for extracting representative text quotes, such as the quote 110A shown in FIG. 1A, from the documents 104A in the target language. Additional details regarding one mechanism disclosed herein for extracting representative quotes 110 from a document are provided below with regard to FIG. 2. Additionally, further details regarding a mechanism for quote extraction can also be found in U.S. patent application Ser. No. 13/051,278, filed on Mar. 18, 2011, and entitled "EXTRACTING QUOTES FROM CUSTOMER REVIEWS", which is assigned to the assigned of the instant patent application, and which is expressly incorporated by reference herein in its entirety. In this regard, it should be appreciated that extracted quotes need not be verbatim text from a document. Rather, a quote might summarize, paraphrase, or otherwise represent a portion of a document. For example, and without limitation, the quote might be a string of text extracted from a customer-supplied review of an item that reflects the semantics and the sentiment that has been expressed by the customer about the item. Other types of documents and quotes can be utilized in other configuration.

In this regard, it is to be further appreciated that the mechanisms disclosed herein can also be utilized with technologies for determining reasons to buy a particular item, or items, from item information. One such mechanism is disclosed in U.S. patent application Ser. No. 14/303,547, entitled "DETERMINING REASONS TO BUY FROM ITEM INFORMATION," which was filed on Jun. 12, 2014, and which claims the benefit of priority of U.S. Provisional Patent Application No. 61/971,509, entitled "EXTRACTING REASONS TO BUY FROM CUSTOMER REVIEWS," which was filed Mar. 27, 2014, both of which are expressly incorporated by reference herein in their entirety.

The target system 102 can also be configured to execute a support identification module 114A. The support identification module 114A utilized by the target system 102 is an executable software component configured to identify documents 104A in the target language that provide textual support for a given quote, such as the quote 110A shown in FIG. 1A. In order to provide this functionality, access to the documents 120A in the source language can be made available to the support identification module 114A in some configurations. In other configurations, the support identification module 114A does not utilize the documents 120A in the source language. In other configurations, an association is maintained between the extracted quotes 110B' and the associated document 120A in the source language (i.e. the document from which a quote was extracted). This information can be utilized to determine which of the documents 120A in the source language support a particular extracted quote 110B' in the target language. Additional details regarding the operation of the support identification module 114A are provided below with regard to FIG. 3.

As discussed briefly above, the source system 116 can also be configured to execute a quote extraction module 108 (shown in FIG. 1B) and a support identification module 114B (shown in FIG. 1A) for extracting representative quotes from the documents 120A in the source language, and for identifying documents 120A in the source language that provide textual support for an extracted quote, respectively. As mentioned above, details regarding the operation of these components are provided below with regard to FIGS. 2 and 3.

In the configuration shown in FIG. 1A, the documents 120A in the source language can be utilized to provide support for a quote 110A extracted from a document 104A in the target language. In particular, the quote extraction module 108 can be executed by the target system 102 to extract a representative quote 110A from a document 104A in the target language. The extracted quote 110 can then be translated into the source language using a language translation system 112. For example, a statistical machine translation system can be utilized to translate the extracted quote 110A in the target language to generate the extracted quote 110A' in the source language. Other types of language translation systems can also be utilized.

Details regarding one illustrative statistical machine translation system that can be utilized to perform the language translations described herein can be found in U.S. patent application Ser. No. 14/867,932, entitled "OPTIMIZED STATISTICAL MACHINE TRANSLATION SYSTEM WITH RAPID ADAPTATION CAPABILITY" filed Sep. 28, 2015, U.S. patent application Ser. No. 14/868,083, entitled "OPTIMIZED STATISTICAL MACHINE TRANSLATION SYSTEM WITH RAPID ADAPTATION CAPABILITY" filed Sep. 28, 2015, and U.S. patent application Ser. No. 14/868,166, entitled "OPTIMIZED STATISTICAL MACHINE TRANSLATION SYSTEM WITH RAPID ADAPTATION CAPABILITY" filed Sep. 28, 2015, all of which are assigned to the assignee of the instant patent application and expressly incorporated herein by reference in their entireties.

It should be appreciated that, according to various configurations, the language translation system 112 can be created in a way that is customized for translating user-generated content. For example, and without limitation, the language translation system 112 can be configured to handle spelling errors, poor punctuation, emoticons, slang, and/or other syntactical or grammatical errors commonly found in user-generated content. In particular, the language translation system 112 can be configured to use only lower case, might include customized pre- and post-processing of text to be translated, and model parameters utilized by the language translation system 112 might be tuned for the particularities of the user-generated content. Other customizations can also be utilized.

In one configuration, the language translation system 112 can be configured to attach high penalties to translation errors that are detrimental to the downstream tasks of sentiment analysis and quote extraction (described in detail below). Other translation errors that are less impactful on sentiment analysis and quote extraction can be penalized less. In one particular configuration, for example, the language translation system 112 can be configured to highly penalize mistranslation in a way that drops function words. This can include missing a word such as "not" and, therefore, changing the entire meaning of a sentence in a translated quote 110 or document 104A or 120A.

In order to address this potential problem, the language translation system 112 can be configured to more greatly penalize translation of an input sentence that removes the term "not" or other similar word more greatly than other types of errors, such as incorrectly pluralizing a word. In this manner, documents 120A will not be identified as supporting an extracted quote 110 when, in fact, they actually do not provide support for the extracted quote 110 (or even mean the opposite). The language translation system 112 can also be customized in other ways for translating user-generated content that is utilized in identifying documents that provide support for a particular statement in other configurations.

Once the extracted quote 110A has been translated to the source language, the source system 116 may execute the support identification module 114B in order to identify the documents in the source language that include support for the extracted quote 110. The number of documents 120A in the source language that provide support for the quote can then be identified (i.e. the supporting documents 120B).

A GUI 124 or other type of user interface can then be generated that includes an indication 122 of the number of documents in the source language that provide support for the extracted quote 110A. In the example where the source documents 120A are item reviews for an item available from a merchant system that have been expressed using the English language, the GUI 124 can present the extracted quote, and further state that "X other reviews in English say the same thing", where X is the number of item reviews in the source language that provide support for the extracted quote 110A.

The target system 102 can also utilize the support identification module 114A to determine the number of documents 104A in the target language that provide support for the extracted quote 110A (i.e. the supporting documents 104B). This information can then be presented in the GUI 124. For instance, in an example where the documents 104A and 120A are item reviews in German and English, respectively, the GUI 124 can present the extracted quote and further state that "Y other reviews in German and X other reviews in English say the same thing", where Y is the number of item reviews (i.e. documents 104B) in the target language that provide support for the quote 110A and where X is the number of item reviews (i.e. documents 120B) in the source language that provide support for the extracted quote 110A.

An indication can also be provided regarding the source of the data. For example, if a customer is browsing an e-commerce site operating in the U.S., the GUI 124 can say that X more people say the same or similar thing in German on a corresponding e-commerce site operating in Germany or Europe. In this regard, it should be appreciated that sources of data other than item reviews can also be mined for quotes that support a particular document. For example, and without limitation, documents available from a product manufacturer or a product review site can be utilized. In this way, an indication can be provided in the GUI 124 indicating, for example, that X more people say the same or similar thing in German on a corresponding e-commerce site provided in Germany or Europe, Y more people say the same thing on the manufacturer's retail site, and Z more people say the same thing on a consumer products review site (e.g. a product review site that specializes in the particular type of product). Other types of documents can also be analyzed in the manner disclosed herein to determine their support for a particular quote.

By providing a greater indication of support for a quote 110 through the analysis of both the documents 104A and 120A in the manner described above and the presentation of information identifying the total number of documents providing support, a customer of a merchant system can be provided with a greater level of confidence that the extracted quote 110 is accurate. In this regard, it should be appreciated that the GUI 124 can include other types of information about an item, including a text description of the item, a price, shipping information, the actual item reviews, and/or other information. For instance, in the illustrative GUI 124 shown in FIG. 1E, quotes are shown that have been extracted from customer-submitted reviews of a digital camera along with other information about the camera, such as its price, weight, customer ratings, etc.

For each of the extracted quotes, the number of documents that support the quote in different languages is also specified in the GUI 124. For example, an indication showing the number of supporting documents 122A is provided in FIG. 1E by stating that "22 more people say the same thing in German". Similarly, an indication showing the number of supporting documents 122B is provided in FIG. 1E by stating that "12 more people say the same thing in English and 31 more people say the same thing in German." Likewise, an indication showing the number of supporting documents 122C is provided in FIG. 1E by stating that "15 more people say the same thing in English and 24 more people say the same thing in German." Other types of indications and GUI elements can also be provided. In this regard, it should be appreciated that the user interfaces disclosed herein are merely illustrative and that other types of user interfaces can also be utilized to indicate the number of documents that provide support for a quote. For example, and without limitation, voice-based user interfaces can be utilized in some configurations to provide this information. Other types of non-graphical user interfaces can also be utilized.

The output described herein as being presented in the GUI 124 can also be presented by other means, such as outputting to another display device coupled to a smartphone (e.g., a "smart" watch), an audio output device, a tactile display for visually impaired, etc. When an audio output device is utilized, the order in which the extracted quotes are played can be based on the number of similar quotes identified in another language. The length of the extracted quote, or quotes, that are played can also be based on the amount of time that a user has to listen to the quote at an acceptable replay speed. The amount of time could be based upon historical usage data for the particular audio device and/or other considerations.

It should also be appreciated that the quote, or quotes, that are selected for presentation in the GUI 124 or other type of user interface can be based on the number of "similar" reviews identified in different languages, and that the total number of quotes shown can also be selected such that the subset of is suited for display on a simplified user interface (e.g., some suboptimal solutions may generate a subset of reviews and may display those reviews). However, these solutions may not consider the limited display space that is available for displaying reviews, and as such, the subset of reviews generated by using these suboptimal solutions may not be appropriate or suitable for displaying on some computing devices. For example, the reviews in the subset may not easily fit on the display of a user computing device, causing portions of the review not to be rendered on the screen (e.g., a review extends past the edge of the display) or causing the position or format of the subset of reviews to change such that the reviews are difficult for users to read (e.g., small text). The number of supporting documents can also be used in conjunction with how that quote may be displayed on a user interface, including the length of the quote or the amount of display space the quote is expected to require. Additionally (or alternatively), the computing device may determine the quality value of the quote based on characteristics of the computing device that will display the review. For instance, the characteristics of the computing device may include the size of the display of the computing device or formatting styles available on the computing device.

Figure 1B:
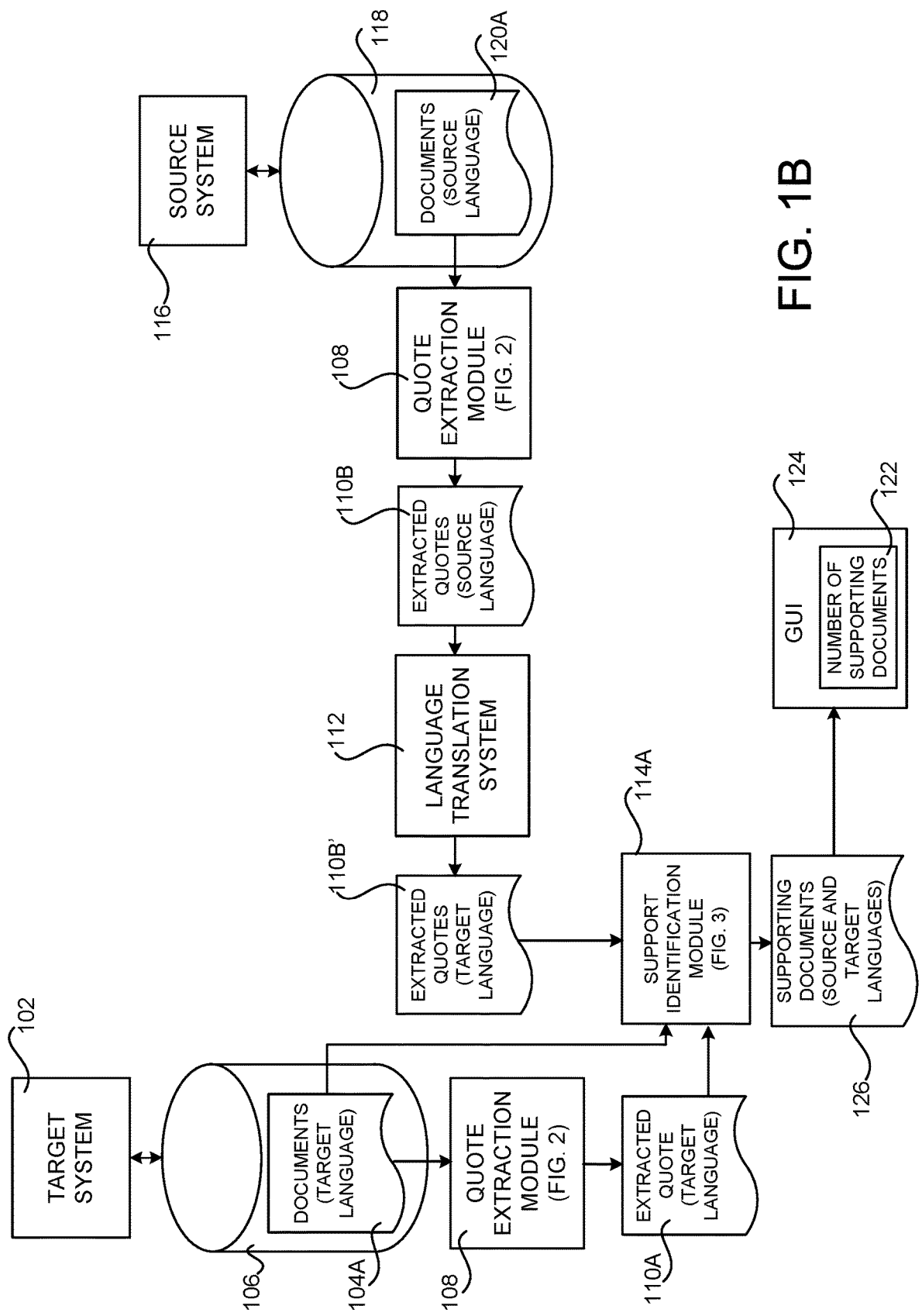

FIG. 1B illustrates aspects of the configuration and operation of another mechanism disclosed herein for identifying documents in one human-readable language that provide support for a quote in another human-readable language. In this configuration, the source system 116 can execute a quote extraction module 108 to extract representative quotes 110B from documents 120A in the source language. The extracted quotes 110B can then be provided to a language translation system 112, such that described above, for translation into the target language. The translated quotes are shown in FIG. 1B as extracted quotes 110B'. The quote extraction module 108 can also merge quotes from the same document 120A that say the same thing. In this way, the same document 120A will not be identified as supporting a quote multiple times.

The target system 102 can also execute a quote extraction module 108 in order to extract a quote 110A from one of the documents 104A in the target language. The target system 102 can also execute a support identification module 114A to identify documents 104A in the target language or extracted quotes 110B' that have been translated to the target language by the language translation system 112 that provide support for the quote 110A extracted from the document 104A in the target language. A GUI 124 can then be provided that identifies the number of documents 104A in the target language and the source language (i.e. the documents 120A that include extracted quotes 110B' that provide support for the quote 108) that provide support for the quote 110A extracted from the document 104A in the target language.

Figure 1C:
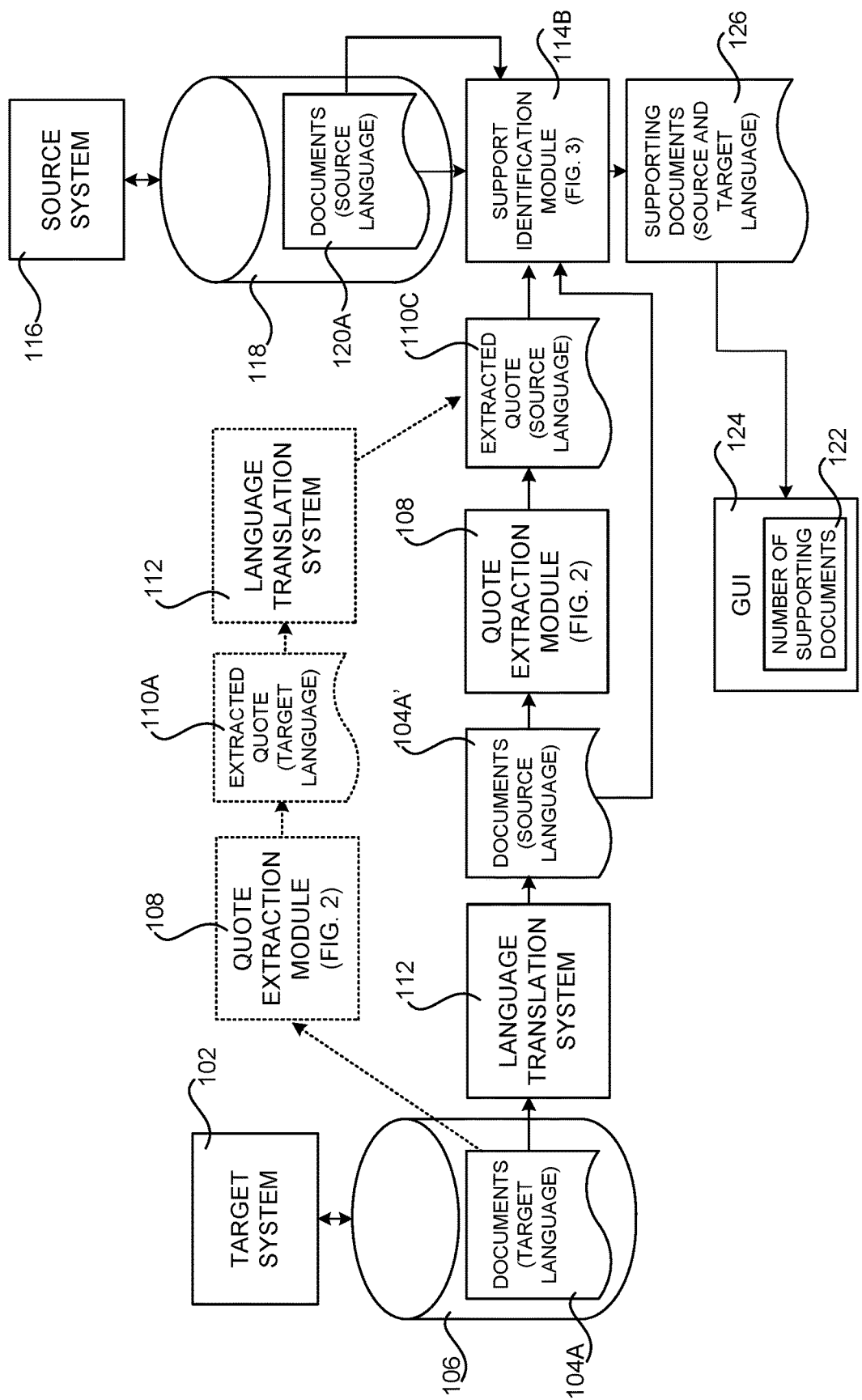

FIG. 1C illustrates aspects of the configuration and operation of another mechanism disclosed herein for identifying documents in one human-readable language that provide support for a quote in another human-readable language. In the configuration shown in FIG. 1C, the language translation system 112 translates the documents 104A in the target language to the source language (i.e. the documents 104A' in FIG. 1C). The quote extraction module 108 can then be executed to extract a representative quote 110C from one of the documents 104A' that has been translated to the source language. The source system 116 can then execute the support identification module 114B in order to identify documents that provide support for the extracted quote 110C among the documents 104A' translated to the source language and the documents 120A maintained by the source system 116 that are in the source language.

In an alternate configuration of the mechanism shown in FIG. 1C, the quote extraction module 108 can extract a representative quote 110A from one of the documents 104A in the target language. The extracted quote 110A can then be machine translated to the source language by the language translation system 112. The source system 116 can then execute the support identification module 114B in order to identify documents that contain support for the extracted quote 110C among the documents 104A' translated to the source language and the documents 120A maintained by the source system 116 in the source language. As in the configurations described above, a GUI 124 can also be provided that includes an indication 122 of the number of documents 104A and 120A in the source and/or target languages that provide support for the quote 110A.

Figure 1D:
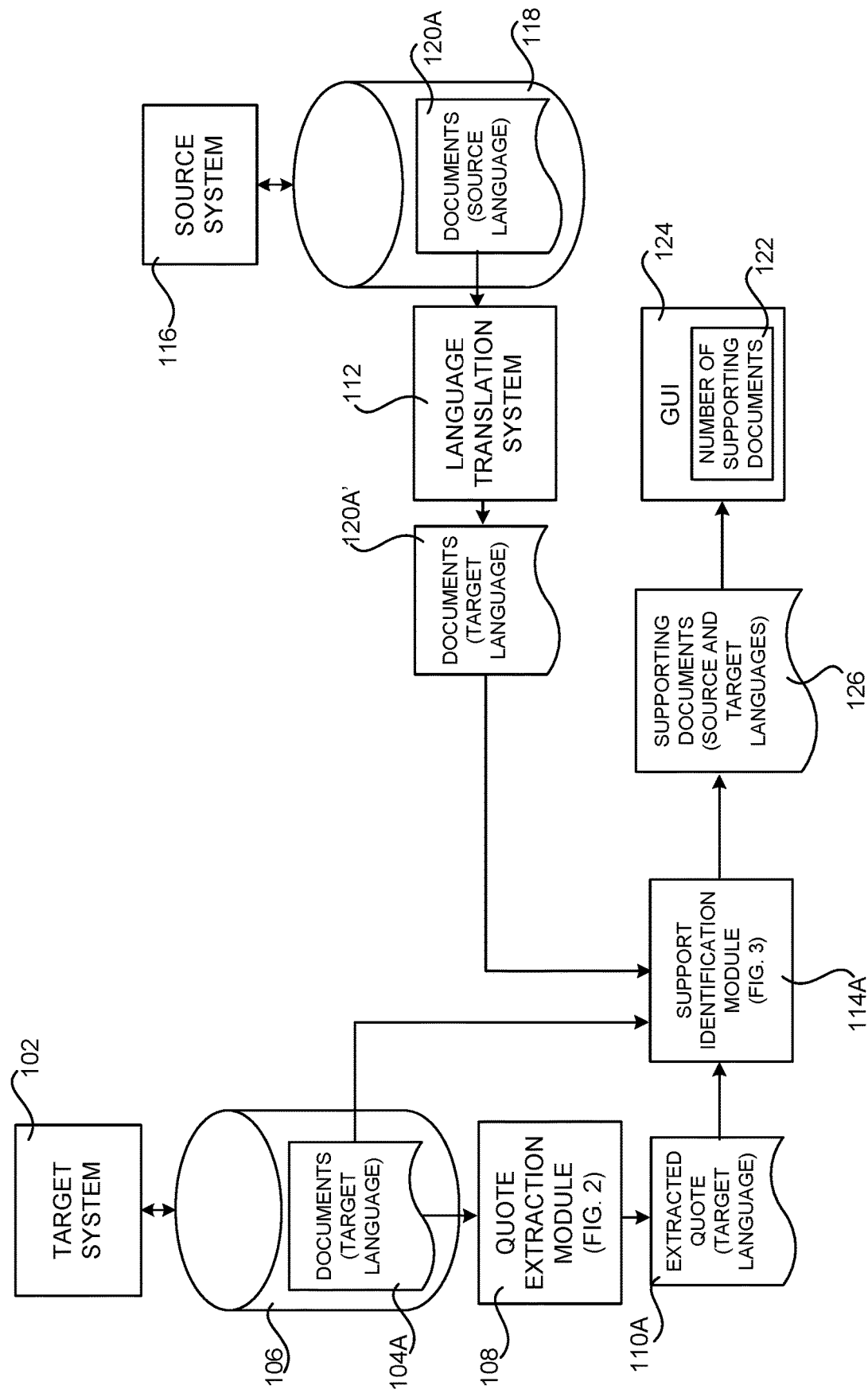
Figure 1E:
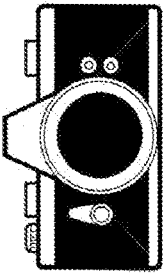
FIG. 1E is a user interface diagram showing aspects of one illustrative graphical user interface disclosed herein for presenting data identifying a number of documents that provide support for a quote, according to one particular configuration.

FIG. 1D illustrates aspects of the configuration and operation of yet another mechanism disclosed herein for identifying documents in one human-readable language that provide support for a quote in another human-readable language. In the configuration shown in FIG. 1D, the documents 120A in the source language are machine translated by the language translation system 112 to the target language (i.e. the documents 120A' shown in FIG. 1D). The quote extraction module 108 also extracts a representative quote 110A from a document 104A in the target language.

The target system 102 then executes the support identification module 114A in order to identify documents (shown as the supporting documents 126 in FIG. 1D) that provide support for the extracted quote 110A among the documents 120A' translated to the target language from the source language and the documents 104A in the target language maintained by the target system 102. As in the examples described above, the GUI 124 can provide an indication 122 of the number of documents in the source and target languages that provide support for the quote 110A. Additional details regarding the various mechanisms described above with regard to FIGS. 1A-1D are provided below with regard to FIGS. 2-4.

It should be appreciated that the various processes described above with regard to FIGS. 1A-1D are typically not performed in real time (e.g. at the time a request is made for a page containing item reviews), but rather are performed offline. The results of the processes described above (i.e. data identifying the number of source and/or target language documents that support a quote 110) can be generated offline, stored, retrieved, and presented in the GUI 124 when a request is received for a page containing item reviews.

It should also be appreciated that while machine translation is utilized in the configurations described above with regard to FIGS. 1A-1D, the results of the machine translation are not typically presented to users. Rather, the results are utilized by the different mechanisms described above, and in further detail below, to identify the documents that provide support for a quote. Because the results of the machine translation are not presented to users, the machine translated text does not have to be of sufficiently high quality for consumption by humans. Rather, the quality of the machine translation only needs to be of sufficient quality to enable a determination as to whether a document includes support for a quote. Other solutions may require greater utilization of processing resources and power to generate higher-quality translations. The disclosed technique requires less power and fewer processing resources by using a lower-quality machine translation system. Technical benefits other than those mentioned herein can also be realized through an implementation of the disclosed technologies.

Figure 2:
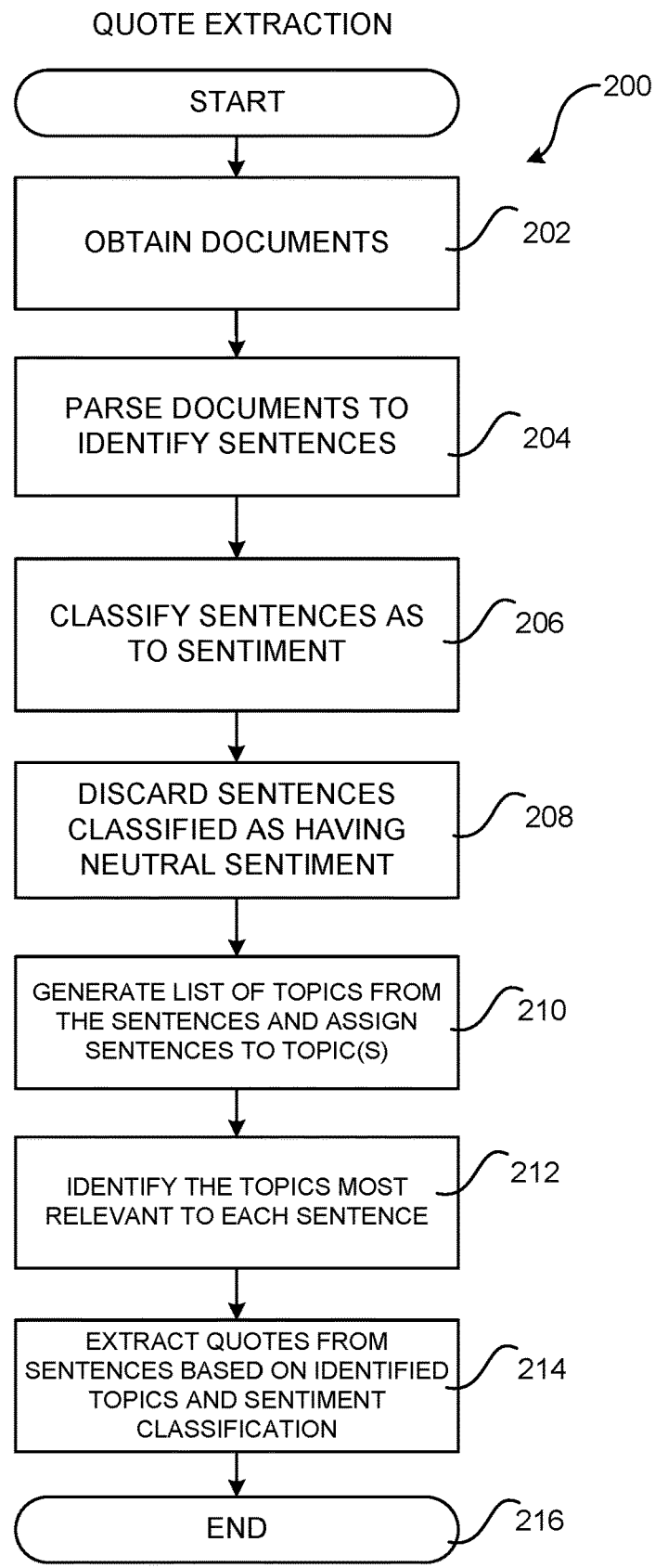
FIG. 2 is a flow diagram showing a routine that illustrates aspects of a mechanism for extracting a representative quote from a document, according to one configuration disclosed herein.

FIG. 2 is a flow diagram showing a routine 200 that illustrates further aspects of the technologies shown in FIGS. 1A-1D and described above. In particular, the routine 200 illustrates aspects of operation of the quote extraction module 108 described above for extracting a representative quote 110 from a document 104 or 120, according to one configuration disclosed herein. It should be appreciated that the logical operations described herein with respect to FIGS. 2, 3, 4, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 200 can be performed by the quote extraction module 108, as described above in regard to FIGS. 1A-1D. In this regard, it will be appreciated that the routine 200 can also be performed by other modules or components executing in the source system 116 or the target system 102, or by any other combination of modules or components.

The routine 200 begins at operation 202, where the quote extraction module 108 obtains and aggregates documents 104A or 120A from which a quote is to be extracted. For example, in the configuration where the documents 104A and 120A are user-supplied reviews associated with items available for purchase from a merchant system, the item reviews for a particular class of items (e.g. electronics) might be obtained and aggregated.

Because the types of topics discussed for different types of items may be different, the quote extraction module 108 may produce more salient topics when executed across documents containing reviews of items of a similar type. For example, the most relevant topics determined for a group of items consisting of small appliances might indicate the reliability of the item, the quality of the construction of the item, the price or value of the item, and the like. However, the most relevant topics determined for a group of items consisting of blenders may include one or more these same topics, along with ice crushing ability, the number of speeds available, the life-expectancy of the blender, and the like.

In one configuration, the quote extraction module 108 utilizes category hierarchies defined for items available from a merchant system to select a category of items, such as all blenders. The selection of the category of items may be narrow enough to generate the most salient topics for the items in the selected category but broad enough to contain sufficient item reviews to produce accurate quote extraction. The quote extraction module 108 then aggregates the documents (i.e. the item reviews) associated with those items belonging to the selected category. It will be appreciated that the group of items selected for aggregation of the associated customer reviews may be as broad as all items in an item catalog and as narrow as a particular item. According to another configuration, the quote extraction module 108 can further aggregate feedback or discussions regarding the item reviews, comments made regarding other subjects related to the items or group of items, and/or the like.

The routine 200 proceeds from operation 202 to operation 204, where the quote extraction module 108 parses individual sentences or phrases from the documents 104 or 120 (e.g. item reviews in one configuration) to create a collection of sentences. It will be appreciated that individual sentences or phrases contained in the documents might discuss a variety of topics directly or indirectly related to the associated items. In one configuration, the quote extraction module 108 parses individual sentences from the documents in order to determine the various topics discussed across the aggregated customer reviews.

The quote extraction module 108 may further parse simple sentences, phrases, or other grammatical constructs (referred to herein generally as "sentences") from complex or compound sentences in the documents in order to better distill multiple topics discussed in the sentences. For example, the quote extraction module 108 may break the compound sentences on commas, coordinating conjunctions, or other transition words or terms in order to parse the simple sentences and phrases for the collection of sentences from the documents. It will be further appreciated that the quote extraction module 108 can utilize other methods of syntactic analysis to parse the sentences and/or phrases from the documents.

From operation 204, the routine 200 proceeds to operation 206, where the quote extraction module 108 classifies each of the individual sentences in the collection of sentences according to the sentiment expressed in each sentence. In addition, once a sentiment for each sentence has been determined, the quote extraction module 108 removes those sentences having neutral sentiment from the collection of sentences at operation 208 before proceeding to identify the topics contained in the collection of sentences. In this regard, it should be appreciated that, in some configurations, sentences having neutral sentiment are not discarded. Additionally, in some configurations sentiment is expressed utilizing more than three dimensions (i.e. positive sentiment, neutral sentiment, and negative sentiment). For instance, the sentiment for a product might be expressed as a number that expresses a greater range of sentiments from strongly dislike to strongly like (e.g. X sizes large to X sizes small, etc.). Other types of sentiment and product attribute classification systems can also be customized for the particular topic and domain that are being utilized.

Since a neutral sentiment sentence does not express a like or dislike of an item or aspect of the item, sentences having neutral sentiment would likely not serve as salient quotes regarding a topic for a particular item that would provide a potential purchaser with a sense of how other customers feel regarding the topic. Additional details regarding one mechanism for determining the sentiment of a sentence is provided in U.S. Pat. No. 8,554,701, issued on Oct. 8, 2013 and entitled "DETERMINING SENTIMENT OF SENTENCES FROM CUSTOMER REVIEWS", which is assigned to assignee of the instant patent application, and which is expressly incorporated by reference herein in its entirety. Other mechanisms for determining the sentiment of a sentence can also be utilized in other configurations.

The routine 200 proceeds from operation 208 to operation 210, where the quote extraction module 108 analyzes the sentences in the collection of sentences to generate a list of topics discussed across the collection of sentences. Each sentence in the collection of sentences is further assigned to one or more of the topics from the list of topics based on the analysis. In one configuration, the quote extraction module 108 utilizes latent Dirichlet allocation ("LDA") to discover the abstract topics that occur in the collection of sentences. The LDA mechanism may provide better topic discovery results than other statistical analysis methods, such as clustering, because it better handles issues in text, such as a single word that has multiple meanings. LDA also produces probability distributions over topics for each sentence, which may be utilized to assign topics to each of the sentences.

The implementation of LDA utilized by the quote extraction module 108 can utilize automatic methods of model selection. For example, the quote extraction module 108 can iteratively repeat the analysis while incrementing the number of topics until the perplexity improves by less than 2%. This may lead to repeatability of results for given a collection of sentences aggregated from one particular category of items, while allowing the parameters of the model to adjust for other categories of items. Alternatively, other methods of model selection may be utilized, such as using a metric similar to Akaike's information criterion ("AIC"). Other extensions to the LDA implementation that may be utilized by the quote extraction module 108 include producing hierarchies of topics.

From operation 210, the routine 200 proceeds to operation 212, where the quote extraction module 108 selects the most relevant topics from the list of topics for a particular item. According to one configuration, the most relevant topics for the particular item represent the topics most discussed in the item reviews (i.e. the documents 120A and 104A) associated with that item. The quote extraction module 108 selects the top-most N topics assigned to the most sentences parsed from the item reviews (i.e. documents 120A and 104A) associated with the particular item as the relevant topics. The number N of topics can vary depending on the information requirements for the extracted quotes 110 to be presented to a user. For example, the quote extraction module 108 might select three to five most relevant topics for each particular item in different configurations.

The routine proceeds from operation 212 to operation 214, where the quote extraction module 108 selects one or more representative sentences from among the sentences parsed from the documents 104A or 120A associated with the particular item for each of the identified most relevant topics. In one configuration, the most representative sentence(s) for a topic are those sentences that are representative both in terms of sentiment and in terms of subject matter.

In order to select the most representative sentence(s) for a topic, the quote extraction module 108 can first determine the majority sentiment (positive or negative) from the sentences assigned to that topic for the item. From among those sentences expressing the majority sentiment, the quote extraction module 108 can then select the one or more sentences that are most relevant to the topic. According to one configuration, the quote extraction module 108 chooses the most the representative sentence using cosine similarity with term frequency-inverse document frequency ("TF-IDF") weighting. Alternatively, the quote extraction module may utilize a graph-based centrality algorithm, such as LexRank, with TF-IDF to determine the most relevant sentence to the topic.

The selected sentences may be further filtered in order to extract the most salient quote 110, or quotes, for presentation to in the GUI 124. For example, the quote extraction module 108 can filter the selected sentences for a minimum specificity in order to remove sentences with broad language, such as "I love it," and favor more specific sentences such as "I love it because it has ample speed settings for different tasks." The quote extraction module can utilize TF-IDF scores of terms in the selected sentences as to the overall collection of sentences. The sentences with a high average of TF-IDF scores may be selected as more specific to the assigned topic. In addition, the extracted sentences can be filtered by a minimum readability level, based on number of words in the sentence, a minimum average word length, and/or other methods of approximating the readability of the sentence.

In further configurations, the quote extraction module 108 can utilize other means to improve the quality of the selected sentences, such as only selecting sentences from item reviews having a minimum helpfulness rating and the like. Once the most representative sentence, or sentences, for the most relevant topics for the item have been selected, the quote extraction module 108 can store the representative sentence as an extracted quote 110 for later presentation in the GUI 124. For example, the quote extraction module 108 can store each selected representative sentence as a quote 110 to be presented in the GUI 124 for a particular item when a page associated with that item is requested from a merchant system. In particular, and as discussed above, the extracted quote 110 can be displayed to a customer or other user of the merchant system. From operation 214, the routine 200 proceeds to operation 216, where it ends.

Figure 3:
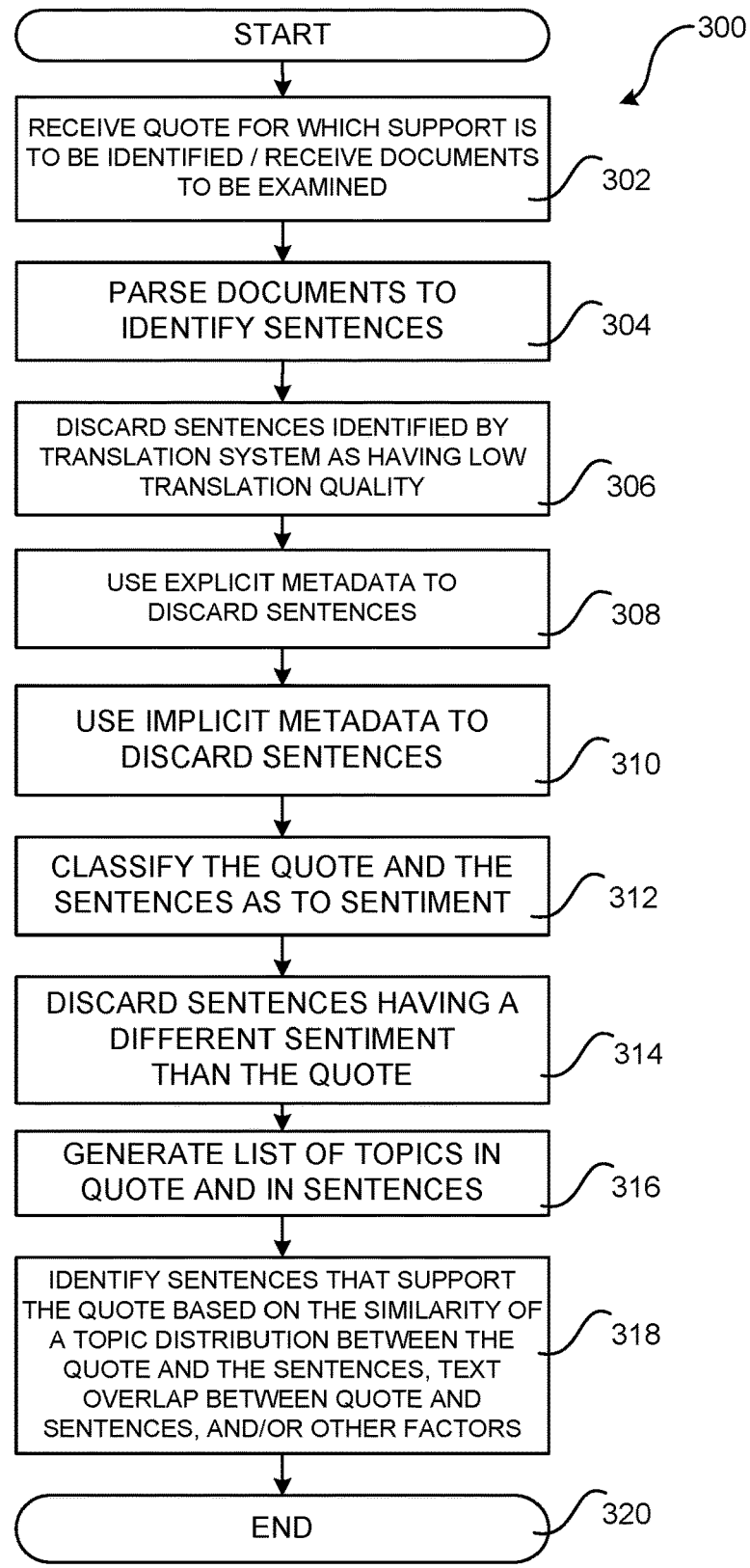
FIG. 3 is a flow diagram showing a routine that illustrates aspects of a mechanism for identifying documents that include support for a quote, according to one configuration disclosed herein.

FIG. 3 is a flow diagram showing a routine 300 that illustrates aspects of the operation of the support identification module 114 described above for identifying documents 104 or 120 that include support for a quote 110. The routine 300 begins at operation 302, where a quote 110 is received for which support is to be identified. As discussed above with regard to FIG. 2, the quote 110 is a representative quote that is extracted from a user-supplied item review in one particular configuration. The extracted quote 110 can also be in the source or target language as described above.

At operation 302, the documents that are to be analyzed for support for the quote 110 are also received. For example, the documents 104A and/or 120A can be examined for support for a quote by the various mechanisms described above with regard to FIGS. 1A-1D. From operation 302, the routine 300 proceeds to operation 304.

At operation 304, the documents 104A or 120A to be analyzed for support for a quote are parsed to identify the sentences contained therein. The parsing can be performed in a manner similar to that described above with regard to operation 204 of the routine 200. Once the documents have been parsed, the routine 300 proceeds from operation 304 to operation 306.

At operation 306, certain sentences that are to be evaluated for support for a quote 110 that have been translated by the language translation system 112 can be discarded. In particular, in one configuration the language translation system 112 provides a measure of the quality of the translation of each sentence. In this configuration, sentences identified as having a low translation quality can be discarded at operation 306. One mechanism for generating a measure of the quality of a translation is described in U.S. patent application Ser. No. 14/868,083, entitled "OPTIMIZED STATISTICAL MACHINE TRANSLATION SYSTEM WITH RAPID ADAPTATION CAPABILITY" filed Sep. 28, 2015, which is assigned to the assignee of the instant patent application, and which is incorporated by reference herein in its entirety.

From operation 306, the routine 300 proceeds to operation 308, where explicit metadata can also be utilized to discard certain sentences from the documents 104A and 120A. The explicit metadata includes data that explicitly provides an indicator of the reliability of a document 104A or 120A. For instance, in the example described above wherein the documents are item reviews, explicit metadata can include user-provided ratings of the item reviews. If an item review is rated poorly by other users, the item review (i.e. the document 104A or 120A) can be discarded at operation 308 and, therefore, excluded from consideration as an item review that might support the extracted quote 110.

As another example of explicit metadata that can be used at operation 308 to discard documents, metadata indicating an age of a document 104A or 120A can be utilized. For instance, if an item review was created five years earlier, the document containing that item review can be discarded and, therefore, excluded from consideration. In a similar fashion, properties associated with a user that created a document 104A or 120A can be utilized to discard documents. For instance, a document 104A or 120A can be discarded, and therefore excluded from consideration, that was submitted by a user that has been ranked poorly by other users, submitted by a user that has not purchased the item that is the subject of the item review, submitted by a user that has authored fewer than a threshold number of item reviews, submitted by a user that has had item reviews rejected, or submitted by a user that has not spent money recently or at all with the merchant system providing the reviews. A numeric (e.g. one out of five stars) rating of the item by the reviewer can also be utilized as explicit metadata in this manner. Other types of explicit metadata can also be utilized to exclude sentences in the documents 104A and 120A from consideration as being supportive of a quote 110. In this regard, it should be appreciated that the explicit metadata might alternately, or additionally, be utilized to up-weigh documents in other configurations.

From operation 308, the routine 300 proceeds to operation 310, where implicit metadata can also be utilized to discard certain sentences from the documents 104A and 120A that might otherwise be identified as providing support for a quote 110. Explicit metadata is data that implicitly provides an indicator of the reliability of a document 104A or 120A. For example, implicit metadata includes data that can be inferred from customer behavior, such as a customer's interaction with a particular item review (e.g. the amount of time a user's mouse cursor hovers over the item review). Other types of implicit metadata include other types of implicit signals indicating review abuse or fraud and/or the trustworthiness of a user that created a particular item review. Other types of implicit metadata can be utilized in other configurations to exclude sentences in the documents 104A and 120A from consideration as being supportive of a quote 110. In this regard, it should be appreciated that the implicit metadata might alternately, or additionally, be utilized to up-weigh documents in other configurations.

From operation 310, the routine 300 proceeds from operation 310 to operation 312, where the sentences parsed from the documents that are remaining after operations 306, 308, and 310, are classified according to the sentiment expressed therein. As mentioned above, one mechanism for determining the sentiment of a sentence is described in U.S. Pat. No. 8,554,701, issued on Oct. 8, 2013 and entitled "DETERMINING SENTIMENT OF SENTENCES FROM CUSTOMER REVIEWS", which is assigned to assignee of the instant patent application, and which is expressly incorporated by reference herein in its entirety.

From operation 312, the routine 300 proceeds to operation 314 where sentences expressing a different sentiment than the quote 110 for which support is to be identified are discarded. By discarding sentences expressing a different sentiment than the quote 110, these sentences cannot be inadvertently identified as including support for the quote 110 at operation 318, described below.

From operation 314, the routine 300 proceeds from operation 314 to operation 316 where a list of topics in the quote 110 for which support is to be identified and the sentences remaining after operations 306, 308, 310, and 316 is generated. The list of topics can be generated in a manner similar to that described above with regard to operation 210 of the routine 200.

From operation 316, the routine 300 proceeds to operation 318, where sentences supporting the extracted quote 110 can be identified based, at least in part, on the similarity of a topic distribution between the topics in the quote and the topics in the sentences. The text overlap between the extracted quote 110 and the sentences can also be utilized to identify sentences contained in the documents 104A and 120A. Other attributes and/or characteristics of the quote 110 and the sentences can also be utilized. If a sentence includes support for a quote 110, the document 104A or 120A (e.g. the item review) containing that sentence is considered to be supportive of the extracted quote 110. From operation 318, the routine 300 proceeds to operation 320, where it ends.

It should be appreciated that the mechanism illustrated in FIG. 3 is merely illustrative and that other technologies can be utilized to match a quote 110 with documents 104A or 120A that provide support for the quote 110. For example, and limitation, multilingual topic models can be utilized to perform the matching. In another implementation, clusters of words can be utilized to identify documents in the source language that support a quote in the target language. Other mechanisms can also be utilized. Additionally, it should be further appreciated that the mechanism described above with regard to FIG. 3 can be implemented to penalize a finding of support for a quote 110 in a document where there actually is none more greatly than not finding that a document supports a quote 110 when the document actually does.

Figure 4:
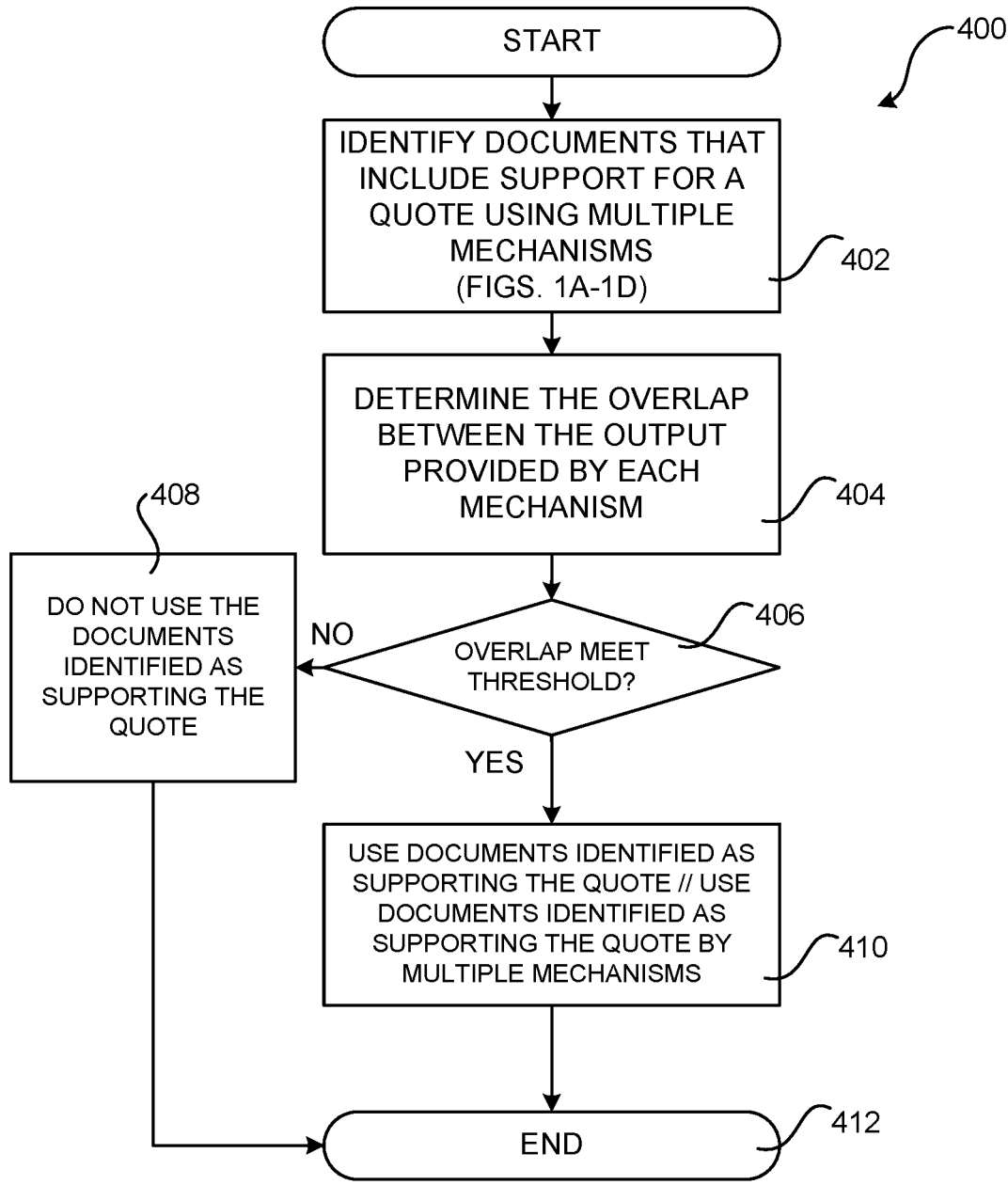
FIG. 4 is a flow diagram showing a routine that illustrates aspects of a mechanism disclosed herein for utilizing the output generated by multiple mechanisms for identifying support for an extracted quote to improve the reliability of the output, according to one configuration disclosed herein.

FIG. 4 is a flow diagram showing a routine 400 that illustrates aspects of a mechanism disclosed herein for utilizing the output from multiple different mechanisms for identifying support for an extracted quote 110, such as those described above with regard to FIGS. 1A-1D, to improve the reliability of the output. As discussed briefly above, in another configuration two or more of the mechanisms described above with regard to FIGS. 1A-1D for identifying documents that provide support for a quote can be performed. The output of the various mechanisms can then be utilized together to improve the reliability of the output. Additional details regarding this aspect are provided below with regard to the routine 400.

The routine 400 begins at operation 402, where documents that include support for a quote 110 can be identified using two or more of the mechanisms described above with regard to FIGS. 1A-1D. Once the documents identified as providing support for the quote 110 have been identified, the routine 400 proceeds from operation 402 to operation 404.

At operation 404, the overlap between the sentences identified as providing support by each mechanism is determined. For example, the mechanism shown in FIG. 1A might indicate that one set of documents provide support for a quote 110, while the mechanism shown in FIG. 1C might indicate that a different set of documents provide support for the same quote 110. The degree of overlap between the results is determined in this example by determining the number of documents that the two sets of results have in common.

From operation 404, the routine 400 proceeds to operation 406, where a determination is made as to whether the overlap between each set of results meets a predetermined threshold value. The threshold value can define the percentage of overlap that is required between different result sets for the result sets to be considered accurate. For example, and without limitation, the threshold value might indicate that 80% of the documents identified as providing support for a quote 110 be contained in two or more result sets. In one configuration, the threshold value is computed using a quote and a corresponding set of documents that have been manually tagged as to whether or not they provide support for the quote. The various mechanisms described above with regard to FIGS. 1A-1D can be applied to the quote and the tagged documents and the output can be compared to determine a threshold value that provides an acceptable level of quality for the results. Other mechanisms can also be utilized to calculated the threshold value.

If, at operation 406, it is determined that the generated results do not meet the threshold, the routine 400 proceeds from operation 406 to operation 408. At operation 408, the results from the various mechanisms are discarded and not utilized as documents that support the quote 110. The routine 400 proceeds from operation 408 to operation 412, where it ends.

If, however, it is determined at operation 406 that the results satisfy the threshold, then the routine 400 proceed from operation 406 to operation 410. At operation 410, the documents identified by the various mechanisms utilized at operation 402 can be utilized as documents that support the quote 110 in the manner described above. In an alternate configuration, only those documents that appear in the results generated by two or more of the mechanisms described above with regard to FIGS. 1A-1D are utilized as documents supporting the quote 110. From operation 410, the routine 400 proceeds to operation 412, where it ends.

As discussed briefly above, the source system 116 and the target system 102 are merchant systems in one particular configuration. As also mentioned above, in this configuration the source system 116 can maintain a data store 118 that is utilized to store reviews (i.e. the documents 120A) for items available for purchase from the source system 116. The item reviews stored by the source system 116 can be expressed using the source language (e.g. English). Similarly, in this configuration the target system 102 can maintain a data store 106 that is utilized to store reviews (i.e. the documents 104A) for items available for purchase from the target system 102. The item reviews stored by the target system 102 can be expressed using the target language, which is different than the source language (e.g. if the source language is English, the target language might be German or French).

As also discussed above, the mechanisms disclosed herein can be utilized to identify item reviews (i.e. the documents 120A) in the source language that provide support for a quote 110 extracted from item reviews (i.e. the documents 104A) in the target language. Additional details regarding a merchant system that can be implemented by the source system 116 and/or the target system 102 (referred to below as "the merchant system") in order to provide online shopping services and the additional functionality disclosed herein are provided below.

In one particular configuration, a user can utilize a user device, such as a desktop or laptop computer, a smartphone, or a tablet device, to access the merchant system across a network, such as the Internet. A user of the merchant system can be an individual or entity that desires to browse, research, review, and/or purchase items offered for sale by an operator of the merchant system. Items available for sale through the merchant system can include, but are not limited to: physical goods, such as TVs, game consoles, cameras, and bikes; digital media products, such as digital audio or video tracks or streaming media; event tickets; media or service subscriptions; and virtually any other type of good or service.

In order to provide the disclosed functionality, the merchant system can include a number of application servers that provide various online shopping services to the user device over a network. The user can use a merchant system client application executing on the user device to access and utilize the online shopping services provided by the merchant system. In one configuration, the client application is a web browser application, such as the MOZILLA FIREFOX web browser from MOZILLA FOUNDATION of Mountain View, Calif. In this configuration, the web browser application can exchange data with the application servers in the merchant system using the hypertext transfer protocol ("HTTP"). Alternatively, the merchant system client application can be a client-side software application configured specifically for providing access to the online shopping services offered by the merchant system. In this regard, it should be appreciated that the merchant system client application can utilize any number of communication methods and protocols known to communicate with the merchant system across a network, including remote procedure calls, SOAP-based web services, remote file access, proprietary client-server architectures, and the like.

The application servers operating in the merchant system can execute a number of modules in order to provide online shopping services to the user. The modules can execute on a single application server or in parallel across multiple application servers in the merchant system. In addition, each module can consist of a number of subcomponents executing on different application servers or other computing devices in the merchant system. The modules can be implemented as software, hardware, or any combination of the two.

In one configuration, the merchant system provides on-line shopping functionality through which a user can browse and purchase items available from the operator of the merchant system. For instance, an application server operating in the merchant system can receive a page request from the merchant system client application, retrieve information regarding a particular item or items offered for sale by the retailer from an item catalog, generate a merchant system page containing various types of information about the item or items, and transmit the page over a network to the merchant system client application executing on the user device for display to the user in an appropriate GUI, such as the GUI 124 described above.

As discussed above, the page generated by the merchant system can also include customer-supplied reviews for the particular item being viewed. In this regard, the page can also include a representative quote extracted from one or more of the reviews. In the manner described above, the page can further include a statement that indicates the number of documents that provide support for the quote in a number of languages. For example, and without limitation, a quote extracted from a German language product review might indicate that "Diese kamera verfügt über hervorragende ISO-bereich" meaning, in English, "This camera has excellent ISO performance." In this example, an additional statement might be provided in the page provided by the merchant system indicating that "2 other reviews in German say the same thing" and/or "25 other reviews in English say the same thing." The number of reviews that provide support for the extracted quote can be computed in the manner described above.

Servers operating within the merchant system can also provide an electronic shopping cart for keeping track of items that the user intends to purchase. The merchant system can further provide a checkout user interface, through which a user can complete the purchase of the items identified in their electronic shopping cart. Once the merchant system receives an order, the merchant system can process the order. For example, for physical items, the merchant system can inform a fulfillment center to fulfill the order. Personnel at the fulfillment center can then retrieve the items from inventory, and pack and ship the ordered items to the user. For digital items, the ordered items can be transmitted from the merchant system or a content distribution network ("CDN") to the user device. Other mechanisms can also be utilized to fulfill orders placed at the merchant system.

In one particular configuration, the merchant system is configured to provide an application store (which might be referred to herein as an "app store"). An app store is an electronic marketplace where customers can browse and purchase application programs for download and use on their own customer devices. An app store can offer applications for use on user devices such as, but not limited to, smartphones, tablets or "slate" computers, set-top boxes, e-readers, laptop or desktop computers, and/or other types of computing devices.

A user of such an app store can use a user device to access the app store through a network, such as the Internet. The user can be an individual or entity that desires to browse, purchase, or has purchased, one or more applications from the app store. As also discussed briefly above, the user device can be a smartphone, personal computer, desktop workstation, laptop computer, tablet computer, notebook computer, e-book reader, game console, set-top box, consumer electronics device, server computer, or any other type of computing device capable of connecting to a data communications network and communicating with the merchant system. The network utilized by the user device to connect to the application store system can be a LAN, a WAN, the Internet, or any other networking topology known in the art that connects a user device to the merchant system.

In some configurations, software components provide functionality for permitting customers to browse and purchase applications available from the app store. For instance, the merchant system implementing the app store can receive a page request from the user device and, in response thereto, retrieve content regarding a particular application or applications offered for sale from the app store referenced by the page request, generate or retrieve content describing the application or applications, and transmit an app store page containing the content over a network to an application store client application executing on the user device for display to the user in an appropriate application store UI.

The app store page can include a name of an application, the name of the application developer that developed the application, a text description of the application, one or more images, videos, or audio files, a price for the application, and/or other information. In the manner described above, the app store page can also include customer-provided reviews of an application along with quotes extracted from the reviews and an indication of the number of other reviews that provide support for the quote. This content can be stored in a suitable database or other type of data store maintained by the application store system for each application offered for sale.

As also discussed briefly above, a user can use the application store client application executing on the user device to access and utilize the functionality provided by the app store. The application store client application can be a web browser or a stand-alone client application configured for communicating with the merchant system that provides the app store and for presenting a suitable GUI, such as the GUI 124, for interacting with the app store. The application store client application can also utilize any number of communication methods known in the art to communicate with the merchant system that provides the app store across a network, including remote procedure calls, network service calls, remote file access, proprietary client-server architectures, and the like.

The app store or some other computing device or service, can also facilitate the acquisition of the applications from the app store. In this regard, the app store can receive payment information from a user device. The app store can also establish an account or update an account for a user. The account information can include a variety of different information, such as one or more payment methods, billing preferences, address information, communication preferences, privacy preferences, and the like. This information can be obtained by the application store system and provided to a billing service. The billing service can also be configured to process payments from users and, in some configurations, provide payment to the software providers of the applications available in the app store.

It should be appreciated that while the technologies disclosed herein are primarily presented in the context of determining item reviews that provide support for a quote extracted from another item review and providing a GUI 124 identifying the number of reviews providing support for the quote to a customer of a merchant system, the technologies disclosed herein are not limited to such an implementation. Rather, and as mentioned above, the technologies disclosed herein can be utilized with virtually any type of text documents. Accordingly, the discussion of the merchant system and the app store presented above should not be construed as limiting the claims set forth below.

Figure 5:
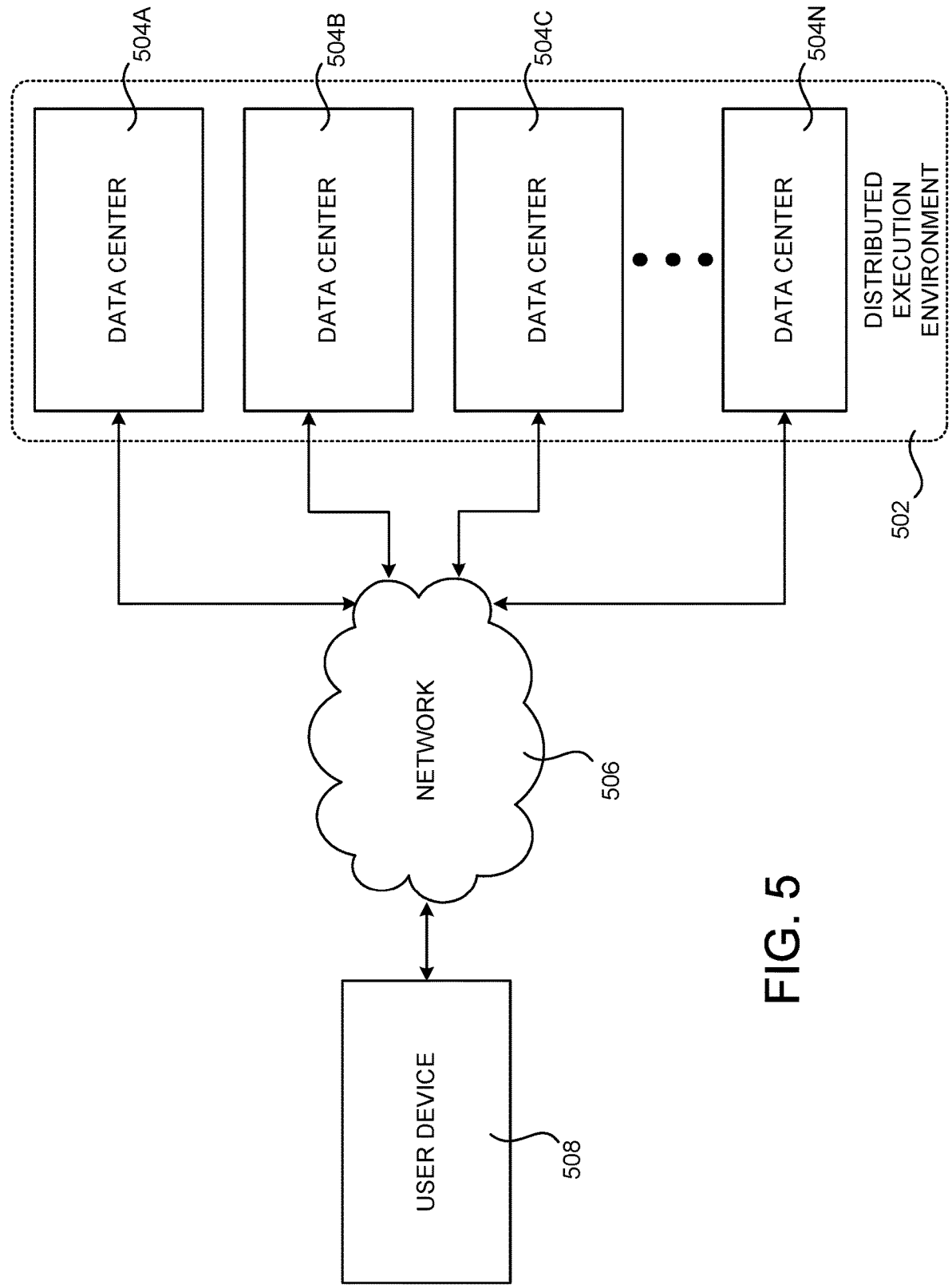
FIG. 5 is a computing system diagram that illustrates a configuration for a distributed computing network that can be utilized to implement aspects of the technologies disclosed herein.

FIG. 5 is a system and network diagram that shows aspects of a distributed execution environment 502 than can provide an operating environment for the various technologies disclosed herein. As will be discussed in greater detail below, the distributed execution environment 502 can provide computing resources for implementing the various technologies disclosed here including, but not limited to, the quote extraction module 108, the language translation system 112, and the support identification module 114. The computing resources described below can also be utilized to store the documents 104A and 120A and to implement a merchant system that utilizes the various technologies disclosed herein in one particular configuration.

The computing resources provided by the distributed execution environment 502 can include various types of computing resources, such as data processing resources, data storage resources, networking resources, data communication resources, network services, and the like. Each type of computing resource provided by the distributed execution environment 502 can be general-purpose or can be available in a number of specific configurations. For example, data processing resources can be available as physical computers or virtual machine instances in a number of different configurations. The virtual machine instances can be configured to execute applications, including web servers, application servers, media servers, database servers, some or all of the services and modules described herein, and/or other types of programs. Data storage resources can include file storage devices, block storage devices, and the like. The distributed execution environment 502 can also be configured to provide other types of resources and network services.

The computing resources provided by the distributed execution environment 502 are enabled in one implementation by one or more data centers 504A-504N (which might be referred herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 can also be located in geographically disparate locations. One illustrative configuration for a data center 504 that implements some of the technologies disclosed herein will be described below with regard to FIG. 6.

Users of the distributed execution environment 502 can access the various resources provided by the distributed execution environment 502 over a network 506, which can be a wide area communication network ("WAN"), such as the Internet, an intranet or an Internet service provider ("ISP") network or a combination of such networks. For example, and without limitation, a user device 508 can be utilized to access functionality provided through the distributed execution environment 502 by way of the network 506. It should be appreciated that a local-area network ("LAN"), the Internet, or any other networking topology known in the art that connects the data centers 504 to remote users can also be utilized. It should also be appreciated that combinations of such networks can also be utilized.

Figure 6:
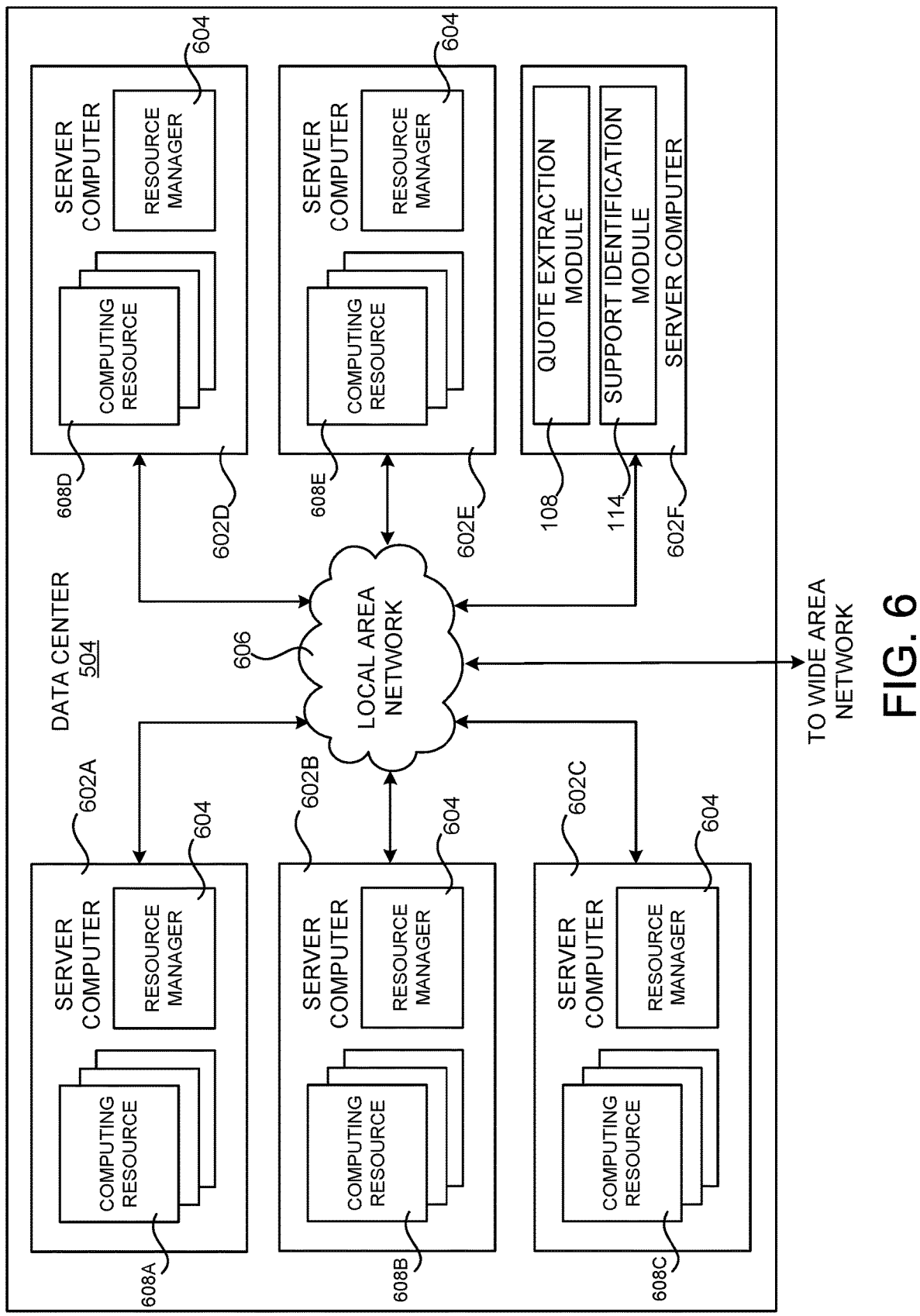
FIG. 6 is a computing system diagram that illustrates aspects of the configuration for a data center that can be utilized to implement aspects of the technologies disclosed herein.

FIG. 6 is a computing system diagram that illustrates one configuration for a data center 504 that can be utilized to implement aspects of the technologies disclosed herein. The example data center 504 shown in FIG. 6 includes several server computers 602A-602F (which might be referred to herein singularly as "a server computer 602" or in the plural as "the server computers 602") for providing computing resources 608A-608E.

The server computers 602 can be standard tower, rackmount, or blade server computers configured appropriately for providing the computing resources 608. As mentioned above, the computing resources 608 can be data processing resources such as virtual machine instances or hardware computing systems, data storage resources, database resources, networking resources, and others. Some of the servers 602 can also be configured to execute a resource manager 604 capable of instantiating and/or managing the computing resources 608. In the case of virtual machine instances, for example, the resource manager 604 can be a hypervisor or another type of program configured to enable the execution of multiple virtual machine instances on a single server 602. Server computers 602 in the data center 504 can also be configured to provide network services and other types of services for supporting the operation of the various technologies disclosed herein.

The data center 504 shown in FIG. 6 also includes a server computer 602F that can execute some or all of the software components described above. For example, and without limitation, the server computer 602F can be configured to execute the quote extraction module 108, the support identification module 114, the language translation system 112, and/or any of the other software components described herein. The server computer 602F can also be configured to execute other components and/or to store data (e.g. the documents 104A and 120A) for providing some or all of the functionality described herein. In this regard, it should be appreciated that the software components illustrated in FIG. 6 as executing on the server computer 602F can execute on many other physical or virtual servers in the data centers 504 in various configurations.

In the example data center 504 shown in FIG. 6, an appropriate LAN 606 is also utilized to interconnect the server computers 602A-602F. The LAN 606 is also connected to the network 506 illustrated in FIG. 5. It should be appreciated that the configuration and network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 504A-504N, between each of the server computers 602A-602F in each data center 504 and, potentially, between computing resources 608 in each of the data centers 504. It should be appreciated that the configuration of the data center 504 described with reference to FIG. 6 is merely illustrative and that other implementations can be utilized.

Figure 7:
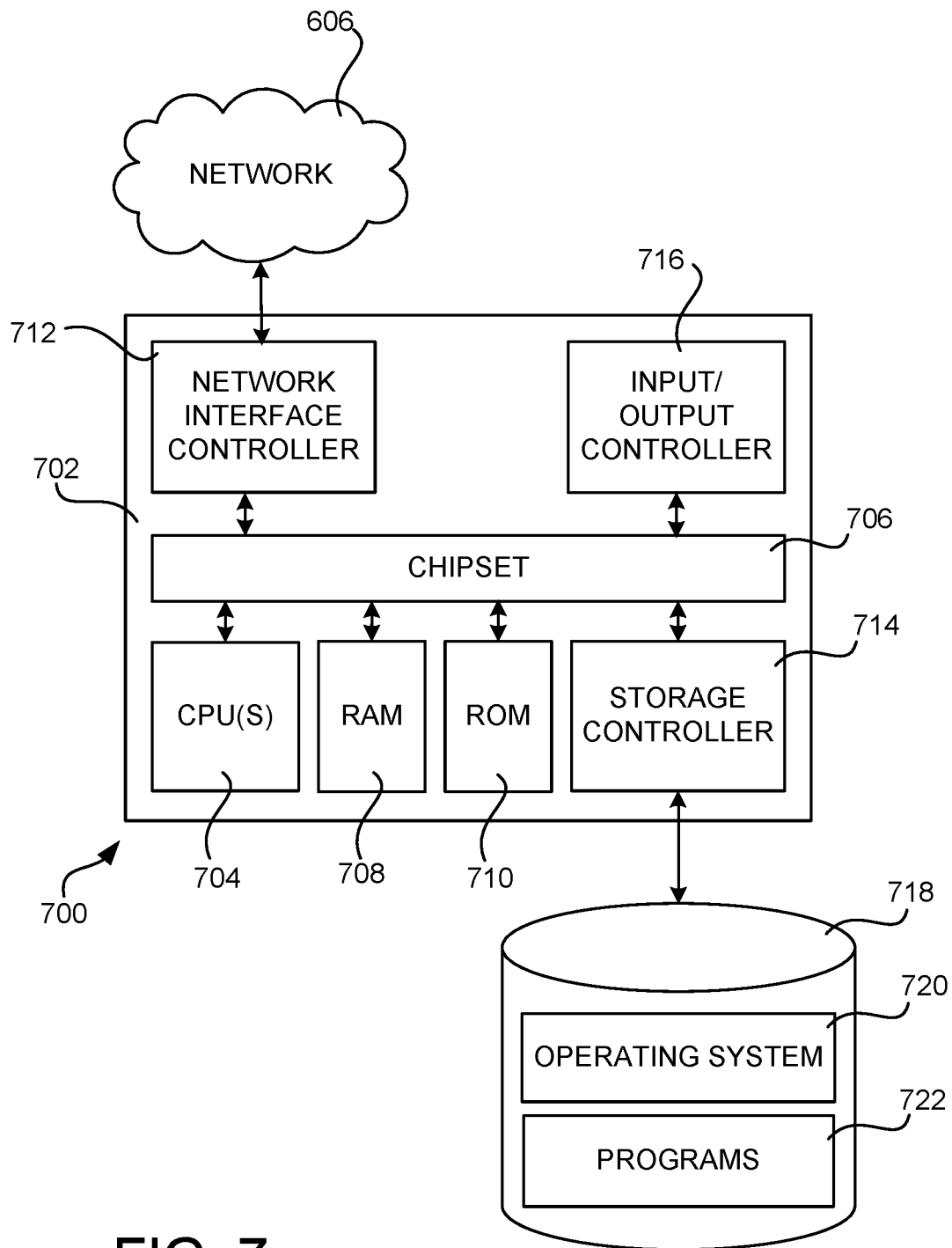
FIG. 7 is a computer architecture diagram showing an illustrative computer hardware architecture for implementing a computing device that can be utilized to implement aspects of the various technologies presented herein.

FIG. 7 shows an example computer architecture for a computer 700 capable of executing program components for implementing various aspects of the functionality described herein. The computer architecture shown in FIG. 7 illustrates a conventional server computer, workstation, desktop computer, laptop, tablet, network appliance, e-reader, smartphone, or other computing device, and can be utilized to execute any of the software components presented herein. For example, the computer architecture shown in FIG. 7 can be utilized to execute the quote extraction module 108, the support identification module 114, and components for implementing the language translation system 112. The computer architecture can also be utilized to execute software components for implementing a merchant system, such as an e-commerce store, and the related functionality described herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 606. The chipset 706 can include functionality for providing network connectivity through a NIC 712, such as a gigabit Ethernet adapter. The NIC 712 is capable of connecting the computer 700 to other computing devices over the network 606. It should be appreciated that multiple NICs 712 can be present in the computer 700, connecting the computer to other types of networks and remote computer systems.

The computer 700 can be connected to a mass storage device 718 that provides non-volatile storage for the computer. The mass storage device 718 can store an operating system 720, programs 722, and data, which have been described in greater detail herein. The mass storage device 718 can be connected to the computer 700 through a storage controller 714 connected to the chipset 706. The mass storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the mass storage device 718 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 718 is characterized as primary or secondary storage, and the like.

For example, the computer 700 can store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the mass storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 718 can store an operating system 720 utilized to control the operation of the computer 700. In one configuration, the operating system 720 is the LINUX operating system. In another configuration, the operating system 720 is the WINDOWS® SERVER operating system from MICROSOFT Corporation. In other configurations, the UNIX operating system or one of its variants can be utilized as the operating system 720. It should be appreciated that other operating systems can also be utilized. The mass storage device 718 can store other system or application programs and data utilized by the computer 700.

In one configuration, the mass storage device 718 or other computer-readable storage media is encoded with computer-executable instructions which, when loaded into the computer 700 and executed, transform the computer from a general-purpose computing system into a special-purpose computer capable of implementing the configurations described herein. These computer-executable instructions transform the computer 700 by specifying how the CPUs 704 transition between states, as described above. According to one configuration, the computer 700 has access to computer-readable storage media storing computer-executable instructions which, when executed by the computer 700, perform the various processes described herein. The computer 700 can also include computer-readable storage media for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, a plotter, or other type of output device. It will be appreciated that the computer 700 might not include all of the components shown in FIG. 7, can include other components that are not explicitly shown in FIG. 7, or might utilize an architecture completely different than that shown in FIG. 7.

It should be appreciated that although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An apparatus for utilizing artificial intelligence-based machine translation to augment document summarization, the apparatus comprising:
   a processor; and
   a non-transitory computer-readable storage medium having instructions stored thereupon which are executable by the processor and which, when executed, cause the apparatus to:
      classify first phrases within first electronic documents expressed using a first human-readable language with a first sentiment type and, using latent Dirichlet allocation, with a first topic type;
      extract a quote in the first human-readable language from the first phrases based, at least in part, on the first sentiment type and the first topic type;
      translate the quote from the first human-readable language to a second human-readable language using statistical machine translation to form a translated quote;
      identify text, expressed using the second human-readable language within second electronic documents, that includes support for the translated quote based, at least in part, on similarity between the first topic type and a second topic type of the text, wherein the text is classified as the second topic type from the second human-readable language;
      determine a total number of the second electronic documents that contain the text that includes support for the translated quote; and
      provide a user interface specifying the total number of the second electronic documents.

2. The apparatus of claim 1, wherein the non-transitory computer-readable storage medium has further instructions stored thereupon to:
   identify one or more of the first electronic documents expressed using the first human-readable language that include support for the text; and
   determine a total number of the first electronic documents expressed using the first human-readable language that provide support for the text,
   wherein the user interface further specifies the total number of the first electronic documents expressed using the first human-readable language that provide support for the text.

3. The apparatus of claim 1, wherein the non-transitory computer-readable storage medium has further instructions stored thereupon to utilize explicit metadata to discard one or more of the second electronic documents expressed using the second human-readable language.

4. The apparatus of claim 3, wherein the explicit metadata comprises one or more of user-provided ratings for the one or more of the second electronic documents expressed using the second human-readable language, metadata indicating an age of the one or more of the second electronic documents expressed using the second human-readable language, or properties associated with a user that created the one or more of the second electronic documents expressed using the second human-readable language.

5. The apparatus of claim 1, the non-transitory computer-readable storage medium has further instructions stored thereupon to utilize implicit metadata to discard one or more of the second electronic documents expressed using the second human-readable language.

6. A non-transitory computer-readable storage medium having computer-executable instructions stored thereupon which, when executed by a computer, cause the computer to:
   translate, using statistical machine translation, first electronic documents in a first human-readable language to a second human-readable language to form translated electronic documents;
   classify representative passages within the first electronic documents or the translated electronic documents with a sentiment type and, using latent Dirichlet allocation, with a topic type;
   extract text from the representative passages based, at least in part, on the sentiment type and the topic type;
   identify, from the translated electronic documents, a first set of the translated documents that provides support for the text in the second human-readable language;
   identify, from second electronic documents in the second human-readable language, a second set of the second electronic documents that provides support for the text in the second human-readable language;
   discard one or more of the first set of the translated electronic documents that do not match the sentiment type and the topic type of the text;
   discard one or more of the second set of the second electronic documents that do not match the sentiment type and the topic type of the text; and
   determine quantities of documents from the first set of the translated electronic documents that provide support for the text and from the second set of the second electronic documents that provide support for the text, whereby a user interface is to be provided that specifies the quantities.

7. The non-transitory computer-readable storage medium of claim 6, wherein the text is extracted from the representative passages of the translated electronic documents in the second human-readable language.

8. The non-transitory computer-readable storage medium of claim 6, wherein the text is extracted from the representative passages of the first electronic documents in the first human-readable language and translated to the second human-readable language.

9. The non-transitory computer-readable storage medium of claim 6, having further computer-executable instructions stored thereupon to:
   obtain data defining a translation quality for sentences in the translated electronic documents in the second human-readable language; and
   discard one or more of the representative passages based on the data defining the translation quality prior to identifying the first set of the translated electronic documents that provide support for the text in the second human-readable language and identifying the second set of the second electronic documents that provide support for the text in the second human-readable language.

10. The non-transitory computer-readable storage medium of claim 6, wherein the non-transitory computer-readable storage medium has further instructions stored thereupon to utilize implicit metadata to discard one or more of the translated electronic documents in the second human-readable language or one or more of the second electronic documents in the second human-readable language.

11. The non-transitory computer-readable storage medium of claim 6, wherein the non-transitory computer-readable storage medium has further instructions stored thereupon to utilize explicit metadata to discard one or more of the translated electronic documents in the second human-readable language or one or more of the second electronic documents in the second human-readable language.

12. The non-transitory computer-readable storage medium of claim 11, wherein the explicit metadata comprises, for the one or more of the translated electronic documents or the one or more of the second electronic documents, one or more of user-provided ratings, metadata indicating an age of the document, or properties associated with a user that created the one or more of the translated electronic documents or the one or more of the second electronic documents.

13. A computer-implemented method, comprising:
   storing, in one or more memory systems, first electronic documents expressed using a first human-readable language and second electronic documents expressed using a second human-readable language;
   classifying, by a processor, representative quotes within the first electronic documents in the first human-readable language with a first sentiment type and, using latent Dirichlet allocation, with a first topic type;
   extracting, by the processor, text expressed using the first human-readable language from the representative quotes based, at least in part, on the first sentiment type and the first topic type;
   translating, by the processor, the text from the first human-readable language to a second human-readable language using statistical machine translation to form translated text;
   identifying, by the processor, one or more of the second electronic documents that include support for the translated text based at least in part on similarity between the first topic type and a second topic type of the second electronic documents, wherein the second electronic documents are classified as the second topic type from the second human-readable language; and
   determining, by the processor, a total number of the second electronic documents expressed using the second human-readable language that provide support for the text.

14. The computer-implemented method of claim 13, further comprising providing a user interface specifying the total number of the second electronic documents expressed using the second human-readable language that provide support for the text.

15. The computer-implemented method of claim 14, further comprising:
   identifying one or more of the first electronic documents expressed using the first human-readable language that include support for the text; and
   determining a total number of the first electronic documents expressed using the first human-readable language that provide support for the text,
   wherein the user interface further specifies the total number of the first electronic documents expressed using the first human-readable language that provide support for the text.

16. The computer-implemented method of claim 13, further comprising utilizing implicit metadata to discard from the ones of the second electronic documents one or more of the second electronic documents expressed using the second human-readable language.

17. The computer-implemented method of claim 13, further comprising utilizing explicit metadata to discard from the ones of the second electronic documents one or more of the second electronic documents expressed using the second human-readable language.

18. The computer-implemented method of claim 17, wherein the explicit metadata comprises one or more of user-provided ratings for the second electronic documents expressed using the second human-readable language, metadata indicating an age of the second electronic documents expressed using the second human-readable language, or properties associated with a user that created the second electronic documents expressed using the second human-readable language.

19. The apparatus of claim 1, wherein the sentiment type includes one of a positive sentiment, a negative sentiment, or a neutral sentiment, and the topic type includes one of an item available for purchase, a class of items, or a characteristic of an item.

20. The non-transitory computer-readable storage medium of claim 6, wherein the non-transitory computer-readable storage medium has further instructions stored thereupon to:
   classify individual documents of the translated electronic documents with topic types; and
   wherein providing support for the text is further based on the topic types.

* * * * *